United States Patent [19]

Kocolowski

[11] 4,332,305
[45] Jun. 1, 1982

[54] AUTOMATIC GEAR SHIFT SAFETY SYSTEM

[76] Inventor: Mike Kocolowski, 712 Thornwood Dr., South Holland, Ill. 60473

[21] Appl. No.: 184,274

[22] Filed: Sep. 5, 1980

Related U.S. Application Data

[63] Continuation-in-part of Ser. No. 968,463, Dec. 11, 1978.

[51] Int. Cl.³ .............................................. B60R 24/02
[52] U.S. Cl. .................................. 180/271; 180/281; 180/286; 49/31
[58] Field of Search ..................... 180/286, 271, 281; 49/31; 74/878, 843

[56] References Cited

U.S. PATENT DOCUMENTS

| | | | |
|---|---|---|---|
| 2,626,003 | 1/1953 | Kutzer | 180/286 |
| 2,823,755 | 2/1958 | Hall | 180/286 |
| 2,882,986 | 4/1959 | Cash | 180/286 |
| 2,992,693 | 7/1961 | Peyton | 180/286 |
| 3,014,549 | 12/1961 | Freeman | 180/286 |
| 3,131,782 | 5/1964 | Freeman | 180/286 |

*Primary Examiner*—Allen N. Knowles
*Attorney, Agent, or Firm*—Sabin C. Bronson

[57] ABSTRACT

An apparatus to provide improved safety for use in a motor vehicle equipped with a transmission having a "park" setting, a door to allow the operator to enter and leave the vehicle, and a gear shift handle having a park position and being moveable by the operator to select the transmission setting desired. The present improvement involves a connecting spring rod, gear shift assembly and automatic transmission which is capable of causing the transmission and gear shift assembly to move to park upon opening of the door. This apparatus provides that both the transmission and gear shift assembly will be in park when the operator leaves the vehicle via the door.

10 Claims, 3 Drawing Figures

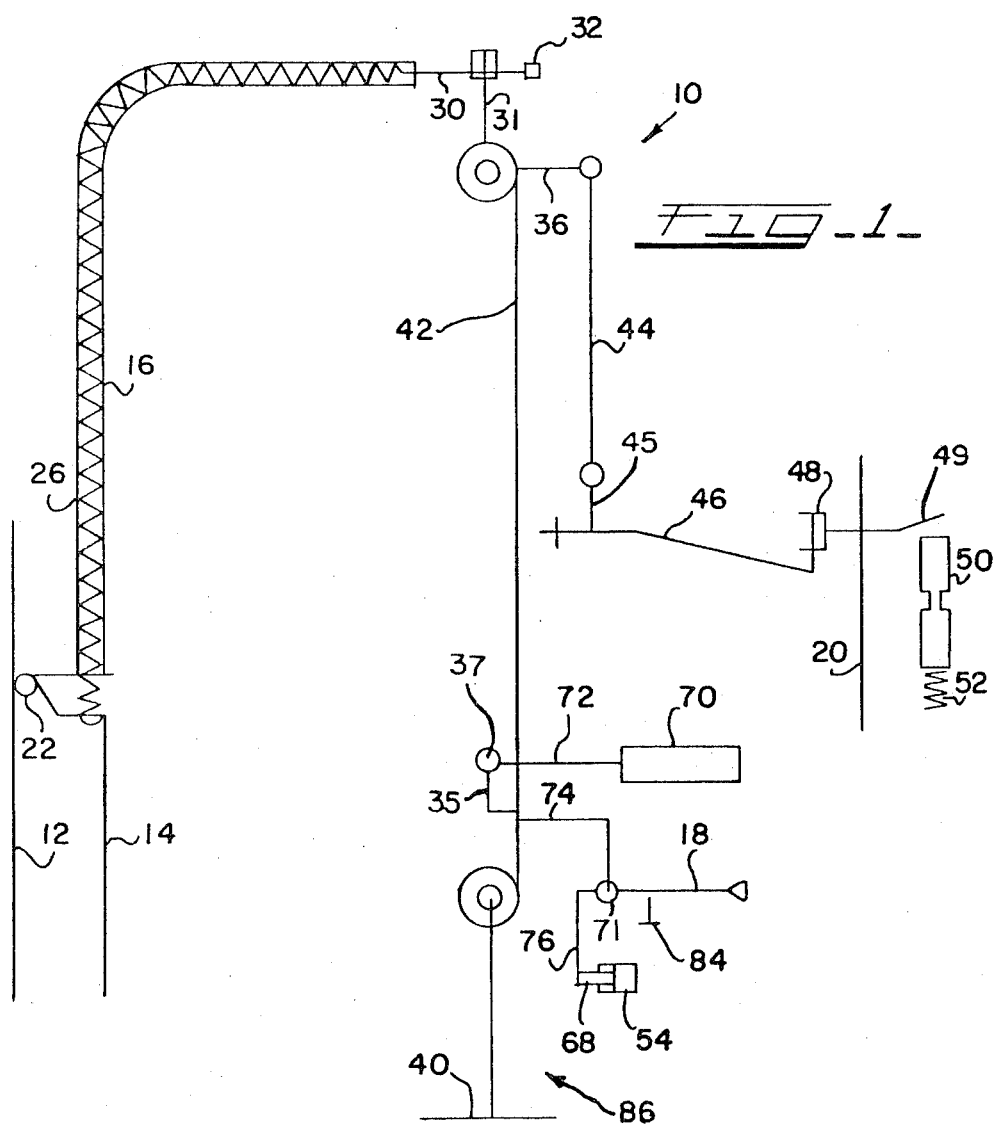

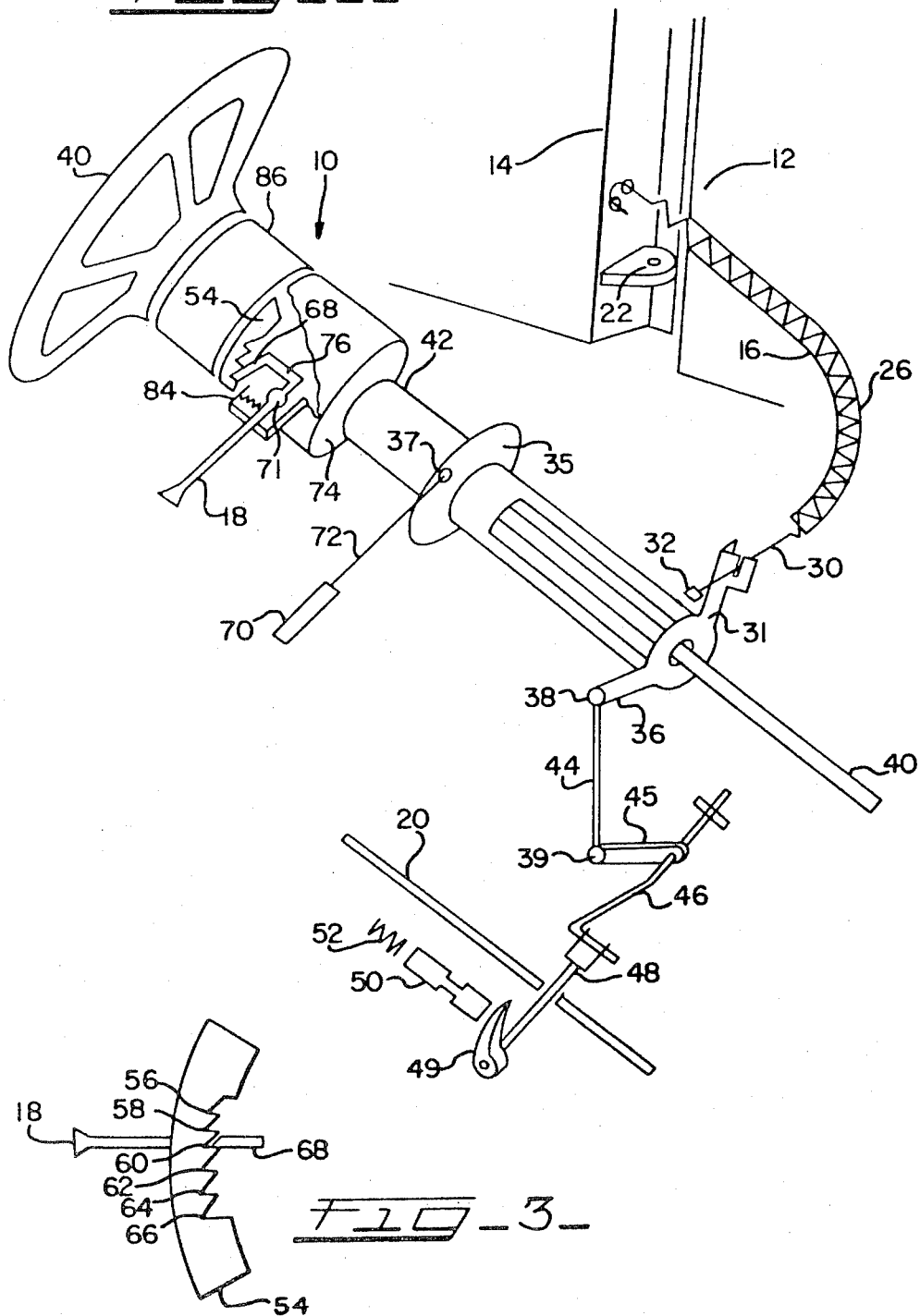

4,332,305

AUTOMATIC GEAR SHIFT SAFETY SYSTEM

RELATED APPLICATION

This application is a continuation-in-part of application Ser. No. 968,463, filed Dec. 11, 1978.

BACKGROUND AND SUMMARY OF THE INVENTION

This invention relates to improved vehicular safety. More particularly, the invention relates to an apparatus to provide that a vehicle is in a safe, immobile condition when the vehicle is left unattended.

Motor driven vehicles are important means of personal or private transportation. Improving the safety of such vehicles is clearly desirable. One area which has been particularly dangerous and unsafe involves the transmission and gear shift assembly of such vehicles. For example, operators of such vehicles may, through mistake or simply inadvertence, neglect to move the gear shift assembly to the park position prior to leaving the vehicle. In these instances, the transmission is left in gear or, at least, in neutral. The vehicle, whether the motor is on or not, is subject to dangerous, unattended movement in these circumstances. A system to provide that the transmission be left in the park setting is clearly advantageous.

Various devices have been previously disclosed. For example, U.S. Pat. No. 2,992,693 sets forth a device to move the transmission but not the gear shift assembly to the park setting when the operator leaves the vehicle. This device is relatively complex and involves both electrical signals and mechanical connections. In addition since the gear shift assembly is not moved in co-ordination with the transmission, the operator of the vehicle, upon returning can easily become confused as to the actual transmission setting. Serious bodily injury and/or property damage can result from such confusion.

Other references which may be of interest include U.S. Pat. Nos. 3,001,618, 3,917,021, 3,939,939, 3,958,658, 3,960,235, 3,939,937 and 4,031,977.

Therefore, one object of the present invention is to provide an apparatus to improve the safety of vehicles.

Another object of the present invention is to provide an apparatus useful to immobilize a vehicle when such vehicle is left unattended.

A still further object of the present invention is to provide a safety apparatus which will allow the operator of a vehicle to know what the setting of the vehicle's transmission is at all times. These and other objects of the present invention will become apparent hereinafter.

An improved vehicle safety apparatus has now been discovered. The present apparatus is to be used in automobiles, trucks, vans, recreational vehicles and the like. Such vehicles are often equipped with a transmission having a plurality of settings, e.g., first, second, third, fourth and fifth gear, reverse, high and low gear, drive, neutral, park and the like. Conventionally, each different transmission setting transmits a different amount of power from the vehicle's motor to the vehicle's wheels. The present apparatus is preferably used in conjunction with vehicles equipped with automatic transmissions. The term "automatic" as applied to vehicle transmissions means, in the conventional and broad sense, a transmission which does not require the vehicle operator to employ a separate clutch in order to move from one transmission setting to another. In any event, the presently useful transmissions include a park setting in which the vehicle is positively restrained, e.g., using various conventional means, from moving. Such a park setting is ideal when the vehicle is left unattended.

The vehicles are further equipped with at least one door to permit entrance to and egress from the vehicle by the operator. This door, preferably adjacent to the vehicle operator's position, is normally closed when the vehicle is being operated.

In addition, the vehicle includes a gear shift handle assembly, which is in communication, preferably mechanical communication, with the transmission. This handle has a plurality of positions corresponding in number to and being representative of, the plurality of transmission settings. This handle is moveable by the vehicle operator to select a transmission setting from among the plurality of such settings as desired. Often, the gear shift assembly includes a visual display or indicator which provides the vehicle operator with an indication of which transmission setting is being used.

The present improvement comprises a connecting spring rod means associated with the above noted door, transmission and gear shift assembly and being capable of acting to cause the transmission to move into the park setting, and the gear shift assembly to move into the corresponding park position in response to the opening of the door. Thus, the present connecting spring rod has the capability to cause both the transmission and the gear shift assembly to move to park in response to the opening of the door, e.g., to allow the operator operator to leave the vehicle. Since the transmission and gear shift assembly move in co-ordination, the chances of the operator being confused regarding the true transmission setting are substantially reduced or eliminated. This is a significant advantage of the present invention over certain previous devices, for example, in U.S. Pat. No. 2,992,693 discussed above.

In one preferred embodiment the present connecting spring rod is capable of mechanically acting to cause both the transmission and gear shift assembly to move into park in response to the opening of the door. That is, preferably, the connecting spring rod is mechanically associated with the door, transmission and gear shift assembly so that the transmission and gear shift assembly are capable of being caused to move into the park setting position, respectively, in response to mechanical forces applied to the connecting spring rod, for example, in opening the door to allow the operator to leave the vehicle. The preferred mechanical nature of the present system provides reduced complexity relative to the prior electro-mechanical devices, reduced maintenance, and improved reliability.

Preferably, one end of the connecting spring rod is mechanically secured, or attached to the door, that is, to a component of the door or door assembly which physically moves as the door is opened.

An additional embodiment involves having the connecting spring rod in the form of an expansion spring coil. This feature allows the connecting spring rod to expand or contract to a limited extent. One portion of the connecting spring rod is preferably located adjacent to the door. The use of a spring coil is particularly applicable in embodiment of the present apparatus which further includes a stop located at the end of the connecting spring rod to be capable of intercepting the slotted arm, as it moves in response to the movement of the door. The stop acts to move the transmission and gear shift assembly in response to the opening of the operator's door. In other words, the stop acts to control the amount of movement in the transmission and gear shift assembly in response to the opening of the door. The use of a connecting spring rod is advantageous in this situation because the coils allow the connecting spring rod to expand in response to the further movement (opening) of the operator's door even though the stop assembly prevents further movement in the transmission and gear shift assembly. Upon closing the door, the coils contract and the connecting spring rod is pushed beyond gear positions and is ready for additional use.

Once the present apparatus has moved the transmission to the park setting and the gear shift assembly to the park position, it is desirable to maintain such setting and position. Therefore, the gear shift assembly is preferably associated with a lock which acts to hold the gear shift in the park position and, because of the relation between the transmission and gear shift assembly, to hold the transmission in the park setting. In effect, the lock acts to insure that the vehicle remains in the park position after the operator has left and the vehicle is unattended. Of course, the lock associated with the gear shift assembly may be released or overcome by the operator manually moving the handle assembly to a different, desired position.

In another preferred embodiment of the present invention, the end of the vehicle's gear shift handle is equipped with a pawl which fits into squared slot teeth of the slot assembly which locks it in the desired gear position. The slot assembly is placed on a stationary post associated with the vehicle's steering column. In this design the pawl at the end of the gear shift handle is beveled in one direction and fits into the beveled slots of the stationary slot assembly. When the door is opened, the pawl on the gear shift handle, which is in communication with the connecting spring rod, slides from any gear position to the park position, thus preventing the automobile from moving when the engine is running.

These and other aspects and advantages of the present invention are set forth in the following detailed description and claims, particularly when considered in conjunction with the accompanying drawing in which like parts bear like reference numerals.

BRIEF DESCRIPTION OF THE DRAWINGS

FIG. 1 is a simplified schematic illustration of one embodiment of the present invention.

FIG. 2 is a perspective diagrammatic view of the embodiment shown in FIG. 1.

FIG. 3 is a plan view of the gear shift slot assembly for the settings of the automatic transmission.

DESCRIPTION OF THE PREFERRED EMBODIMENT

Referring now to the drawings, the system shown generally at 10 involves a passenger car 12, an operator's door 14, a connecting spring rod 16, a gear shift handle 18 and an automatic transmission 20.

More specifically, door 14 adjacent to the left front portion of the passenger cabin of vehicle 12 may be opened to allow entrance to and egress from the vehicle 12 by the operator. Door 14 opens around hinge 22. Connecting spring rod 16 is secured to door 14 by passing the end of spring rod 16 through a hole in door 14. Alternately, spring rod 16 may be welded, bolted or otherwise secured or attached to door 14.

Connecting spring rod 16 is surrounded by sheath 26 for rigidity. At the other end of connecting spring rod 16 is segment 30.

Segment 30 extends through slotted arm 31 and itself terminates in enlarged stop 32. Slotted arm 31 includes a generally downwardly extending slot within which segment 30 may move. Slotted arm 31 is a moveable part of the gear shift assembly shown generally at 42. As segment 30 moves to the left in FIG. 1 (so that stop 32 moves toward slotted arm 31 in FIG. 2), in response to the opening of door 14 as will be discussed below, stop 32 comes closer to and finally contacts slotted arm 31. When stop 32 is in contact with slotted arm 31, these two elements, i.e., slotted arm 31 and stop 32, co-operate to draw the gear shift assembly 42 and transmission 20 to the park position.

Segment 30 passes through slotted arm 31 which provides mechanical communication between connecting spring rod 16, gear shift handle 18 and automatic transmission 20. Slotted arm 31 joins with gear shift arm 36, leading to transmission 20, and to gear shift handle 18. Slotted arm 31 is joined to gear shift arm 36 and gear shift assembly 42 so that any movement of segment 30 to the left in FIG. 1 in response to the opening of door 14 results in a corresponding movement in both gear shift arm 36 and gear shift assembly 42.

Gear shift arm 36 is pivotally linked as at 38 to gear shift arm 44 which is pivotally linked as at 39 to arm 45 as shown in FIGS. 1 and 2, so that movement in gear shift arm 36 causes a corresponding movement in gear shift arms 44 and 45. Shaft 46 is connected to shaft 48 which translates the upward movement of gear shift arm 45 into movement of valve 50 of transmission 20. For example, as gear shift arm 45 moves upwardly in response to the opening of door 14, arm 49 on the end of shaft 48 will move so that valve 50 is caused to move forwardly because of spring 52. Slot assembly 54, as shown in FIG. 3, includes a plurality of beveled slots 56, 58, 60, 62, 64 and 66 which correspond to the plurality of settings of automatic transmission 20. Thus, slot 56 corresponds to the park setting, slot 58 to the reverse setting, slot 60 to the neutral setting, slot 62 to the drive setting, slot, slot 64 to the low setting, and slot 66 to the second low setting. Gear shift handle 18 has a beveled tooth pawl 68 which fixes the position of the transmission gear in slot assembly 54. Pawl 68 is moved in response to the movement of the gear shift handle 18 to place transmission 20 is a different setting as desired.

Element 40 is the steering wheel and shaft. The steering wheel shaft passes through the stationary post 86 which holds the beveled slot assembly 54. The gear shift assembly 42 encircles the steering wheel shaft.

Gear shift assembly 42 is directly linked to gear indicator 70 via arm 72, and to gear shift handle 18 via connector 74. Gear indicator 70 and gear shift handle 18 are linked together so that movement in the gear shift handle 18 is reflected in gear indicator 70 which provides an indication of the position of gear shift handle 18 and the setting of transmission 20.

Gear shift handle 18 is also pivotally linked as at 71 with extension 76 which includes an upwardly extending beveled tooth 68. Stationary slot assembly 54 is placed on the cylindrical steering wheel post 86 through which the shaft of steering wheel 40 passes, and is designed to accept and hold tooth 68 securely in place. Gear shift handle 18, extension 76, beveled tooth 68 and slot assembly 54 are designed so that tooth 68 is securely locked in slot 56 whenever gear shift handle 18 is in the park or P position. This mechanism acts to lock the vehicle 12 in the safe park mode when left unattended. An additional safety feature involves spring 84 which also acts to lock gear shift handle 18 in the park position of the slotted assembly 54. Of course, both of the locking systems can be easily overcome by the operator manually moving gear shift handle 18 to a different position, as desired.

System 10 functions as follows: The operator brings vehicle 12 to a stop, and gear shift handle 18 is still in a transmission gear position. In fact, gear shift handle 18 can be in the relatively unsafe N or neutral position. This is the situation shown in FIGS. 1 and 2.

The operator exits the vehicle 12 by opening door 14, connecting spring rod 16, including segment 30, stop 32 and slotted arm 31 move in response to the opening of door 14. The movement of slotted arm 31 causes transmission 20 through gear shift arms 36 and 44, and shaft element 46 and 48 and arm 49 to move to the P or Park setting as described above. Substantially simultaneously, the movement of slotted arm 31 causes gear shift handle 18, connector arm 74, arm 72, and gear indicator 70 to move to the Park or P position as described previously. Additionally, the locking mechanism, including extension 76, beveled tooth 68 and slot assembly 54, and spring 84 are activated, as previously described, to lock gear shift handle 18 in the P position and, indirectly, to lock the transmission 20 in the P setting.

Slotted arm 31 is prevented from moving excessively to the left in FIG. 1 in response to the opening of door 14 by the action of the stop of the slotted assembly 54. Spring action allows the connecting spring rod 16 to expand in further response to the wider opening of door 14, even though slotted arm 31 is held stationary by the action of the stop of slotted assembly 54.

The vehicle 12 is now in the safe, Park position while being left unattended.

The operator, upon returning to vehicle 12, manually selects the desired position of gear shift handle 18 and continues his operation of vehicle 12. During normal operation when door 14 is closed, slotted arm 31 moves in response to the changes in position of gear shift handle 18, and the corresponding setting changes in transmission 20.

I claim:

1. An apparatus for use in a motor powered vehicle equipped with (1) a transmission having a plurality of settings including a park setting in which said vehicle is positively restrained from moving; (2) at least one door to permit entrance to and egress from said vehicle by the operator of said vehicle; and (3) a gear shift handle in communication with said transmission, said handle having a plurality of positions corresponding to said plurality of transmission settings, said handle being moveable by said operator to select a transmission setting from among the plurality of such settings as desired, said apparatus comprising; connecting spring rod means associated with said door, said transmission and said handle and being capable of acting to cause said transmission to move into said park setting and said handle to move into said corresponding park position in response to the opening of said door.

2. The apparatus of claim 1 wherein said connecting spring rod means is mechanically associated with said door, said transmission and said handle so that said transmission and said handle are capable of being caused to move into said park setting and position, respectively, in response to mechanical forces applied to said connecting spring rod means.

3. The apparatus of claim 1 wherein said transmission is an automatic transmission.

4. The apparatus of claim 1 wherein said connecting spring rod means is secured to said door.

5. The apparatus of claim 1 which further comprises stop means located in relation to said connecting rod means to be capable of intercepting said connecting spring rod means and acting to prevent excessive movement of said handle in response to the opening of said door.

6. The apparatus of claim 1 wherein one portion of said connecting spring rod means is in the form of a spring coil to allow said connecting spring rod means to expand or contract.

7. The apparatus of claim 5 wherein one portion of said connecting spring rod means is in the form of a spring coil to allow said connecting spring rod means, to expand or contract.

8. The apparatus of claim 1 wherein said handle is associated with lock means to hold said handle in the park position.

9. The apparatus of claim 6 wherein one portion of said connecting spring rod means in the form of a coiled spring, is located adjacent to said door.

10. The apparatus of claim 7 wherein one portion of said connecting spring rod means in the form of a coiled spring, is located adjacent to said door.

* * * * *